US009064613B2

(12) United States Patent
Chou et al.

(10) Patent No.: US 9,064,613 B2
(45) **Date of Patent: *Jun. 23, 2015**

(54) CORROSION RESISTANT ELECTRICAL CONDUCTOR

(71) Applicant: Tyco Electronics Corporation, Berwyn, PA (US)

(72) Inventors: George Jyh-Shann Chou, Mechanicsburg, PA (US); Robert Daniel Hilty, Sunnyvale, CA (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/039,094

(22) Filed: Sep. 27, 2013

(65) Prior Publication Data

US 2014/0023880 A1 Jan. 23, 2014

Related U.S. Application Data

(63) Continuation of application No. 13/103,552, filed on May 9, 2011, now Pat. No. 8,574,722.

(51) Int. Cl.
*B32B 15/01* (2006.01)
*H01B 1/02* (2006.01)
*C23C 28/02* (2006.01)

(52) U.S. Cl.
CPC ........... *H01B 1/02* (2013.01); *Y10T 428/12722* (2015.01); *Y10T 428/12944* (2015.01); *Y10T 428/12889* (2015.01); *Y10T 428/12479* (2015.01); *Y10T 428/12715* (2015.01); *C23C 28/02* (2013.01); *C23C 28/023* (2013.01); *C23C 28/028* (2013.01)

(58) Field of Classification Search
None
See application file for complete search history.

(56) References Cited

U.S. PATENT DOCUMENTS

| | | | | |
|---|---|---|---|---|
| 5,294,486 | A * | 3/1994 | Paunovic et al. | 428/672 |
| 5,360,991 | A * | 11/1994 | Abys et al. | 257/666 |
| 6,130,479 | A * | 10/2000 | Chalco et al. | 257/734 |
| 6,319,741 | B1 * | 11/2001 | Izumi et al. | 438/30 |
| 6,403,234 | B1 * | 6/2002 | Kodama et al. | 428/675 |
| 6,451,449 | B2 * | 9/2002 | Asakura et al. | 428/615 |
| 6,872,470 | B2 * | 3/2005 | Minamikawa | 428/672 |
| 7,495,333 | B2 * | 2/2009 | Miyazaki et al. | 257/704 |
| 8,013,428 | B2 * | 9/2011 | Hooghan et al. | 257/666 |
| 8,142,906 | B2 * | 3/2012 | Taira et al. | 428/647 |
| 2001/0008709 | A1 * | 7/2001 | Asakura et al. | 428/647 |
| 2003/0022017 | A1 * | 1/2003 | Minamikawa | 428/672 |
| 2007/0126096 | A1 * | 6/2007 | Fu et al. | 257/677 |
| 2009/0061253 | A1 * | 3/2009 | Yoshida et al. | 428/632 |
| 2009/0291321 | A1 * | 11/2009 | Hooghan et al. | 428/647 |

(Continued)

FOREIGN PATENT DOCUMENTS

| | | | |
|---|---|---|---|
| EP | 1915039 | * | 4/2008 |
| JP | 61-202786 | * | 9/1986 |

(Continued)

*Primary Examiner* — John J Zimmerman

(57) ABSTRACT

An electrical conductor has a metal substrate. A seal layer is provided exterior of the metal substrate. A nickel layer is provided exterior of the seal layer. The seal layer is a non-nickel based metal. Optionally, the seal layer may be tin based. Optionally, the seal layer may create intermetallic interface layers with the nickel layer and the metal substrate. Optionally, the electrical conductor may constitute a contact configured for mating with at least one of a printed circuit board or another mating contact.

8 Claims, 1 Drawing Sheet

(56) References Cited

U.S. PATENT DOCUMENTS

| | | | | |
|---|---|---|---|---|
| 2010/0175908 | A1* | 7/2010 | Okamoto et al. | 174/126.2 |
| 2010/0263921 | A1* | 10/2010 | Nakahara et al. | 174/257 |
| 2011/0008646 | A1* | 1/2011 | Cahalen et al. | 428/655 |
| 2011/0294368 | A1* | 12/2011 | Nakata et al. | 439/887 |

FOREIGN PATENT DOCUMENTS

| | | | |
|---|---|---|---|
| JP | 06-200395 | * | 7/1994 |
| JP | 08-055521 | * | 2/1996 |
| JP | 2001-342593 | * | 12/2001 |
| WO | WO 2009/043536 | * | 4/2009 |

* cited by examiner

CORROSION RESISTANT ELECTRICAL CONDUCTOR

CROSS REFERENCE TO RELATED APPLICATIONS

This application is a continuation application of U.S. patent application Ser. No. 13/103,552 filed May 9, 2011, now U.S. Pat. No. 8,574,722, and titled CORROSION RESISTANT ELECTRICAL CONDUCTOR, the subject matter of which is herein incorporated by reference in its entirety.

BACKGROUND OF THE INVENTION

The subject matter herein relates generally to corrosion resistant electrical conductors.

Electrical conductors are used to transmit data signals and/or power. Typical examples of electrical conductors are contacts used as part of an electrical connector that may be electrically connector to a wire, electrical traces on a printed circuit board, or another contact of another electrical connector. Other examples of electrical conductors are conductive traces on a printed circuit board. The electrical conductors typically include a metal substrate, such as a copper or copper alloy substrate. To enhance the properties or characteristics of the metal substrate, such as to reduce corrosion or provide a harder surface for connection to another electrical component, the metal substrate is typically plated, such as with a nickel plating layer and a gold plating layer. The nickel plating layer is used as a buffer between the gold plating layer and the copper substrate.

However, conventional nickel-gold plated copper conductors are not without disadvantages. For example, the nickel-gold plating may be insufficient to resist corrosion. For example, a problem exists with pitting corrosion that occurs through the nickel-gold plating layer due to pin holes existing in the gold plating layer and/or the nickel plating layer. Counter measures such that a nickel plating layer and/or a gold plating layer are thickened have been considered, but such counter measures increase the cost of the plating.

A need remains for an electrical conductor that is corrosion resistant.

BRIEF DESCRIPTION OF THE INVENTION

In one embodiment, an electrical conductor is provided having a metal substrate. A seal layer is provided on and exterior of the metal substrate. A nickel layer is provided on and exterior of the seal layer. A gold layer is provided on and exterior of the nickel layer. The seal layer is a non-nickel based metal.

Optionally, the seal layer may be tin based. The tin based seal layer may be bright, semi-bright, or matte tin plated on the metal substrate. The tin based seal layer may be flash tin plated on the metal substrate. Optionally, the seal layer may have a lower porosity than the nickel layer. The seal layer may be pin hole free. The seal layer may be more noble than the nickel layer.

Optionally, the seal layer may form intermetallic interface layers from solid state inter-diffusion and reaction with the nickel layer and the metal substrate. The intermetallic process creating the intermetallic interface layers may cause a volumetric increase in the seal layer thereby sealing pin holes in at least one of the seal layer, the nickel layer or the metal substrate. Optionally, the seal layer may be heat treated and/or reflowed thereby increasing the growth rate of intermetallic interface layers.

Optionally, the seal layer may have a thickness selected based on the metal compounds of the metal substrate, the nickel layer and the seal layer such that either substantially all or all of the metal of the seal layer is converted to intermetallic interface layers between the seal layer and the metal substrate and between the seal layer and the nickel layer. The seal layer may have a thickness less than 25% of a combined thickness of the nickel layer and the gold layer. The seal layer may have a thickness less than 10% of a combined thickness of the nickel layer and the gold layer.

Optionally, the electrical conductor may constitute a contact configured for mating with at least one of a printed circuit board or another mating contact. The contact includes the metal substrate, the seal layer, the nickel layer and the gold layer.

In another embodiment, an electrical conductor is provided having a metal substrate. A tin based seal layer is provided on and exterior of the metal substrate. A nickel layer is provided on and exterior of the seal layer. A gold layer is provided on and exterior of the nickel layer.

In a further embodiment, an electrical conductor is provided having a metal substrate. A seal layer is provided directly on and exterior of the metal substrate. An intermetallic interface layer is defined between the seal layer and the metal substrate. A nickel layer is provided directly on and exterior of the seal layer. An intermetallic interface layer is defined between the seal layer and the nickel layer. A gold layer is provided on and exterior of the nickel layer.

DETAILED DESCRIPTION OF THE INVENTION

Figure 1:
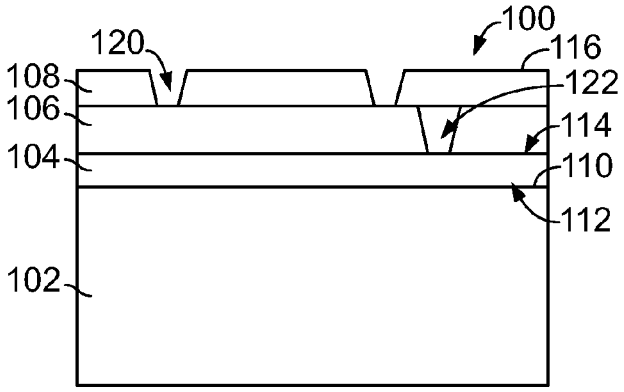
FIG. 1 is a cross-sectional view of a portion of an electrical conductor formed in accordance with an exemplary embodiment.
Figure 2:
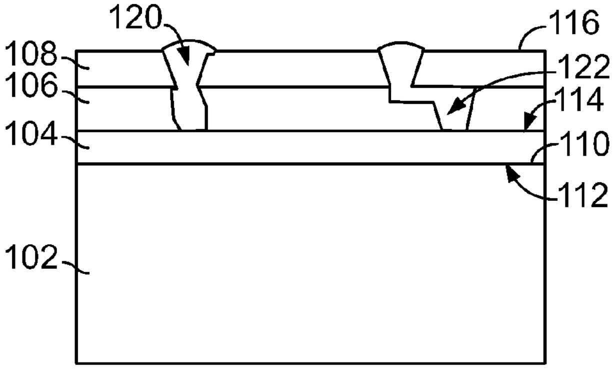
FIG. 2 is a cross-sectional view of a portion of the electrical conductor showing corrosion resistance to pitting.

FIG. 1 is a cross-sectional view of a portion of an electrical conductor 100 formed in accordance with an exemplary embodiment. FIG. 2 is a cross-sectional view of a portion of the electrical conductor 100 showing corrosion resistance to pitting.

The electrical conductor 100 is suitable for use as a contact or terminal, such as those used in an electrical connector. The electrical conductor 100 may be terminated to an end of a wire or alternatively may be configured for mounting to a printed circuit board. In an alternative embodiment, the electrical conductor 100 may be a conductive trace on a printed circuit board. The electrical conductor 100 exhibits high resistance to corrosion.

The electrical conductor 100 includes a metal substrate 102, such as a copper substrate, a copper alloy substrate, a steel substrate and the like. The metal substrate 102 forms the base metal for the metal conductor 100. A seal plating layer 104 is provided on the metal substrate 102. A nickel plating layer 106 is provided on the seal plating layer 104 and the metal substrate 102. The nickel plating layer 106 may include nickel alloys (e.g. Ni—S, Ni—P, Ni—W and the like). A gold plating layer 108 is provided on the nickel plating layer 106, the seal plating layer 104 and on the metal substrate 102. The gold plating layer 108 may be soft gold (e.g. pure gold) or hard gold, such as gold alloys (e.g. Co—Au, Ni—Au and the like). Other layers may be used in alternative embodiments any of between, above or below any of the plating layers 104, 106, 108. The plating layers 104, 106, 108 enhance properties or characteristics of the electrical conductor 100. For example, the plating layers 104, 106, 108 may provide corrosion resistance. The plating layers 104, 106, 108 may provide enhancements to other characteristics in addition to corrosion resistance.

In an exemplary embodiment, the seal plating layer 104 is tin based. The seal plating layer 104 may be a tin alloy, such as a tin nickel material. The seal plating layer 104 may be another metal or metal alloy in alternative embodiments, such as silver or silver alloy or gold. In an exemplary embodiment, the seal plating layer 104 is a non-nickel based metal. The seal plating layer 104 may be a non-group VII based metal. The seal plating layer 104 may be a non-transition metal. The seal plating layer 104 may be a noble metal. The seal plating layer 104 may be made from a metal or metal alloy that readily and easily undergoes intermetallic formation with the metal substrate 102 and/or the nickel plating layer 106.

The metal substrate 102 includes an outer surface 110. In an exemplary embodiment, the seal plating layer 104 is provided directly on the outer surface 110 of the metal substrate 102. Provided "directly on" means that the layer engages the other layer without other layers in between. The seal plating layer 104 is provided exterior of the metal substrate 102. The seal plating layer 104 is formed by a plating process on the metal substrate 102. For example, the seal plating layer 104 may be formed by electroplating, electroless plating, or immersion plating. The seal plating layer 104 may be deposited by other means or processes in alternative embodiments. In an exemplary embodiment, the tin based seal plating layer 104 is bright tin plated on the metal substrate 102. The small grains of bright tin plating may promote inter-diffusion between the seal plating layer 104 and the metal substrate 102 and/or the nickel plating layer 106. Alternatively, the tin based seal plating layer 104 may be semi-bright tin plated or matte tin plated. In other alternative embodiments, the seal plating layer 104 may be flash tin plated on the metal substrate 102.

The tin based seal plating layer 104 may react with the metal substrate 102, which may be copper, to undergo intermetallic formation to copper tin (CuSn) intermetallics (e.g. $Cu_6Sn_5$, $Cu_3Sn$ and the like) from solid state diffusion and/or in a heat treatment or reflow process. An intermetallic interface layer 112 is defined at the interface between the seal plating layer 104 and the metal substrate 102. The intermetallic interface layer 112 is harder than either the seal plating layer 104 or the metal substrate 102. The intermetallic interface layer 112 may be continuous and nonporous. The intermetallic interface layer 112 has a high relative nobility as compared to the metal substrate 102. The intermetallic interface layer 112 is resistive to corrosion. The intermetallic interface layer 112 seals the interface between the metal substrate 102 and the seal plating layer 104. Optionally, the intermetallic layer formation may be forced or sped up by increasing the temperature of the electrical conductor 100. Because some or all of the seal plating layer 104 undergoes intermetallic layer formation, the intermetallic interface layer 112 may be thicker than the seal plating layer 104 after the intermetallic layer formation.

In an exemplary embodiment, the nickel plating layer 106 is provided directly on the seal plating layer 104. The nickel plating layer 106 is exterior of the seal plating layer 104. The nickel plating layer 106 is formed by a nickel plating process, such as electroplating. The nickel plating layer 106 may be deposited on the seal plating layer 104 by other means or processes in alternative embodiments.

The tin based seal plating layer 104 reacts with the nickel plating layer 106 from solid state diffusion and/or in a heat treatment or reflow process to form a layer of nickel tin (NiSn) intermetallics (e.g. $Ni_3Sn$, $NiSn_3$ and the like). An intermetallic interface layer 114 is defined at the interface between the seal plating layer 104 and the nickel plating layer 106. The intermetallic interface layer 114 is harder than either the seal plating layer 104 or the nickel plating layer 106. The intermetallic interface layer 114 may be continuous and nonporous. The intermetallic interface layer 114 has a high relative nobility as compared to the nickel plating layer 106. The intermetallic interface layer 114 is resistive to corrosion. The intermetallic interface layer 114 seals the interface between the nickel plating layer 106 and the seal plating layer 104. Optionally, the intermetallic layer formation may be forced or sped up by increasing the temperature of the electrical conductor 100. Because some or all of the seal plating layer 104 undergoes intermetallic layer formation, the intermetallic interface layer 114 may be thicker than the seal plating layer 104 after the intermetallic layer formation. Optionally, after the intermetallic layer formation, the seal plating layer 104 may be substantially or entirely transformed into the intermetallic interface layer 112 and/or 114.

In an exemplary embodiment, the gold plating layer 108 is provided directly on the nickel plating layer 106. The gold plating layer 108 is exterior of the nickel plating layer 106. The gold plating layer 108 includes an outer surface 116 that defines an exterior or outer surface of the electrical conductor 100. The gold plating layer 108 is formed by plating over the nickel plating layer 106. In an exemplary embodiment, the gold plating layer 108 is electroplated. The gold plating layer 108 may be deposited on the nickel plating layer 106 by other means or processes in alternative embodiments.

The gold plating layer 108 includes pin holes 120 that inevitably exist in the gold plating layer 108 due to the relative thinness of the gold plating layer 108. As shown in FIG. 2, pitting corrosion of the nickel plating layer 106 is started from the pin hole 120 of the gold plating layer 108. The nickel plating layer 106 may also include pin holes 122 occurring therein. Pitting corrosion of the nickel plating layer 106 may extend from the pin holes 120 to the pin holes 122. In an exemplary embodiment, the seal plating layer 104 provides a buffer between the metal substrate 102 and the nickel and gold plating layers 106, 108. The seal plating layer 104 inhibits its corrosion of the metal substrate 102.

In an exemplary embodiment, the seal plating 104 is pin hole free and does not include pin holes like the nickel and gold plating layers 106, 108. The seal plating layer 104 has a lower porosity than the nickel plating layer 106 reducing and/or eliminating pitting corrosion to the metal substrate 102.

In an exemplary embodiment, the seal plating layer 104 is more noble than the nickel plating layer 106. The seal plating layer 104 is less susceptible to corrosion than the nickel plating layer 106. The intermetallic formation at the inner and outer surfaces of the seal plating layer 104 hardens the seal plating layer 104 and/or increases the nobility of the seal plating layer 104 at the intermetallic interface layers 112, 114. The intermetallic interface layers 112, 114 have a high resistance to corrosion, effectively sealing the metal substrate 102 from the environment external of the electrical conductor 100.

The thicknesses of the plating layers 104, 106, 108 may be selected to balance the effectiveness of the corrosion resistance with the added cost of providing a thicker layer. In an exemplary embodiment, the gold plating layer 108 has a thickness of approximately 15 μin. The nickel plating layer 106 has a thickness of approximately 50 μin. The seal plating layer 104 has a thickness of approximately 10 μin. Other thicknesses of the plating layers 104, 106, 108 are possible in alternative embodiments. For example, the gold plating layer 108 may be flash plated, such as approximately 5-10 μin, due to the reduced corrosion effect from using the seal plating layer 104.

In an exemplary embodiment, the nickel plating layer 106 is generally thicker than the gold plating layer 108 and the seal plating layer 104. Optionally, the seal plating layer 104 may be less than 25% of the combined thickness of the nickel-gold plating layers 106, 108. Optionally, the seal plating layer 104 may be less than 10% of the combined thickness of the nickel-gold plating layers 106, 108. In other alternative embodiments, the seal plating layer 104 may be approximately equal to the thickness of the nickel plating layer 106. In other alternative embodiments, the seal plating layer 104 may be thicker than that nickel plating layer 106.

In an exemplary embodiment, the seal plating layer 104 has a thickness selected such that either substantially all or all of the metal of the seal plating layer 104 is converted to the intermetallic interface layers 112, 114. Optionally, more of the metal of the seal plating layer 104 may be undergo conversion or reaction with the nickel plating layer 106 than with the metal substrate 102. Alternatively, more of the metal of the seal plating layer 104 may be undergo conversion or reaction with the metal substrate 102 than with the nickel plating layer 106. The thickness of the seal plating layer 104 may be selected based on the metal compounds of the metal substrate 102, the nickel plating layer 106 and the seal plating layer 104. Depending on the metals used in the metal substrate 102, the nickel plating layer 106 and the seal plating layer 104, the amount of intermetallic conversion at the intermetallic interfaces 112, 114 may vary. The amount of the metal of the seal plating layer 104 that is converted may be different depending on the metal compounds.

In an exemplary embodiment, the intermetallic formation process causes a volumetric increase in the seal plating layer 104, thereby sealing any pin holes in the seal plating layer 104 and/or in the nickel plating layer 106 or the metal substrate 102. Optionally, the electrical conductor 100 may be heat treated, or otherwise subjected to an increase in temperature, thereby increasing the growth rate of intermetallic formation between the seal plating layer 104 and the metal substrate 102 and/or the nickel plating layer 106.

Figure 3:
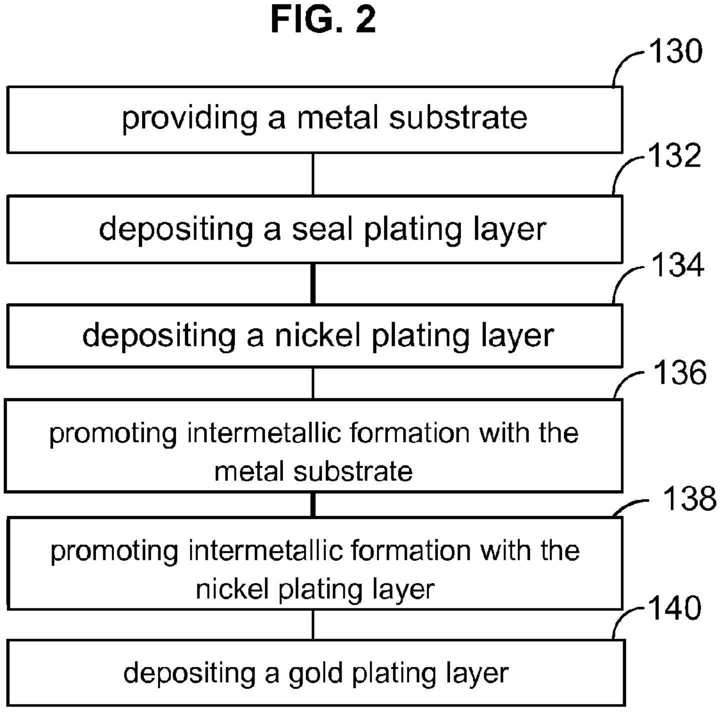
FIG. 3 illustrates a method of manufacture of an electrical conductor in accordance with an exemplary embodiment.

FIG. 3 illustrates a method of manufacture of an electrical conductor in accordance with an exemplary embodiment. The method includes providing 130 a metal substrate. The method includes depositing 132 a seal plating layer on the metal substrate. The method includes depositing 134 a nickel plating layer on the seal plating layer.

The method includes promoting 136 intermetallic formation between the seal plating layer and the metal substrate. The intermetallic formation stems from solid state inter-diffusion and reaction with the seal plating layer and the metal substrate. The intermetallic formation may be promoted based on the metals of the metal substrate and the seal plating layer. The intermetallic formation may be promoted by increasing a temperature of the electrical conductor during or after the manufacturing process to increase the amount of intermetallic formation and/or the thickness of the intermetallic interface layer between the seal plating layer and the metal substrate.

The method includes promoting 138 intermetallic formation between the seal plating layer and the nickel plating layer. The intermetallic formation stems from solid state inter-diffusion and reaction with the seal plating layer and the nickel plating layer. The intermetallic formation may be promoted based on the metals of the nickel plating layer and the seal plating layer. The intermetallic formation may be promoted by increasing a temperature of the electrical conductor during or after the manufacturing process to increase the amount of intermetallic formation and/or the thickness of the intermetallic interface layer between the seal plating layer and the nickel plating layer.

The method includes depositing 140 a gold plating layer on the nickel plating layer. In an exemplary embodiment, the gold plating layer is deposited after the intermetallic formation to eliminate the possibility of nickel diffusion through the gold plating layer, which may occur if the gold plating layer were deposited prior to promoting intermetallic formation between the seal plating layer and the nickel plating layer. In an alternative embodiment, the gold plating layer may be deposited prior to promoting intermetallic formation. Other steps may be performed before, during or after the steps identified in FIG. 3.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. An electrical conductor comprising:

a metal substrate;

a seal layer provided exterior of the metal substrate, the seal layer being a non-nickel based metal, said seal layer being deposited by one of electroplating, electroless plating, physical vapor deposition, chemical vapor deposition, thermal e-beam deposition, printing or coating on the metal substrate;

a nickel layer provided exterior of the seal layer; and a gold layer provided exterior of the nickel layer;

wherein the seal layer has a lower porosity than the nickel layer.

2. The electrical conductor of claim 1, wherein the seal layer is deposited directly on the metal substrate.

3. The electrical conductor of claim 1, wherein the nickel layer is deposited directly on the seal layer.

4. The electrical conductor of claim 1, wherein the gold layer is deposited directly on the nickel layer.

5. The electrical conductor of claim 1, further comprising a second seal layer deposited between the nickel layer and gold layer.

6. The electrical conductor of claim 5, further comprising a second nickel layer deposited between the second seal layer and the gold layer.

7. The electrical conductor of claim 1, wherein the seal layer has a thickness selected based on the metal compounds of the metal substrate, the nickel layer and the seal layer such that either substantially all or all of the metal of the seal layer is converted to intermetallic interface layers between the seal layer and the metal substrate and between the seal layer and the nickel layer.

8. The electrical conductor of claim 1, wherein the seal layer creates intermetallic interfaces with the nickel layer and the metal substrate, the intermetallic formation process creating the intermetallic interface layers cause a volumetric increase in the seal layer thereby sealing pin holes in at least one of the seal layer, the nickel layer or the metal substrate.

* * * * *